(12) United States Patent
Schornig et al.

(10) Patent No.: US 12,438,816 B2
(45) Date of Patent: Oct. 7, 2025

(54) QUANTIFYING APPLICATION QUALITY OF EXPERIENCE UNDER DIFFERENT PATH PERFORMANCE MOTIFS

(71) Applicant: Cisco Technology, Inc., San Jose, CA (US)

(72) Inventors: Eduard Schornig, Haarlem (NL); Jean-Philippe Vasseur, Saint Martin d'Uriage (FR); Michal Wladyslaw Garcarz, Cracow (PL); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/858,416

(22) Filed: Jul. 6, 2022

(65) Prior Publication Data

US 2024/0015104 A1    Jan. 11, 2024

(51) Int. Cl.
*H04L 47/24*    (2022.01)
*H04L 41/0816*  (2022.01)

(52) U.S. Cl.
CPC .......... *H04L 47/24* (2013.01); *H04L 41/0816* (2013.01)

(58) Field of Classification Search
None
See application file for complete search history.

(56) References Cited

U.S. PATENT DOCUMENTS

| | | | |
|---|---|---|---|
| 7,492,720 B2 * | 2/2009 | Pruthi | H04L 43/0852 709/224 |
| 9,516,101 B2 * | 12/2016 | Acosta Amador | H04L 67/30 |
| 10,601,869 B2 | 3/2020 | Joch et al. | |
| 10,862,771 B2 | 12/2020 | Tomkins et al. | |
| 11,234,048 B2 | 1/2022 | Arpirez Vega et al. | |
| 11,716,241 B1 * | 8/2023 | Joseph | H04L 41/0654 709/224 |
| 11,722,718 B2 * | 8/2023 | Harviainen | H04N 21/23439 709/231 |
| 11,736,740 B2 * | 8/2023 | Knecht | H04N 21/2393 709/219 |
| 2013/0100822 A1 * | 4/2013 | Caillerie | H04B 7/04 370/241 |

(Continued)

OTHER PUBLICATIONS

Ahmad, et al., "Supervised Learning based QoE Prediction of Video Streaming in Future Networks: A Tutorial with Comparative Study", online: https://arxiv.org/pdf/2202.02454.pdf, Jan. 2022, accessed Jun. 27, 2022, 7 pages.

(Continued)

*Primary Examiner* — Atta Khan
(74) *Attorney, Agent, or Firm* — Lee & Hayes, P.C.; James M. Behmke

(57) ABSTRACT

In one embodiment, a device obtains media data captured by an endpoint of an online application that results from conducting a test in a network that subjects traffic of the online application to a particular network path degradation pattern. The device receives user feedback regarding the media data from one or more user interfaces. The device computes, based on the user feedback, a quality of experience metric for the online application associated with the particular network path degradation pattern. The device causes a configuration change to be made with respect to the online application, based on the quality of experience metric.

16 Claims, 14 Drawing Sheets

(56) References Cited

U.S. PATENT DOCUMENTS

2016/0006794 A1* 1/2016 Acosta Amador ...... H04L 67/02
                                                  709/202
2016/0381116 A1* 12/2016 Hui ......................... H04L 69/02
                                                  455/425
2018/0278486 A1* 9/2018 Mermoud ................ G06N 5/04

OTHER PUBLICATIONS

"The E-Model: A Computational Model for Use in Transmission Planning", ITU-T Telecommunication Standardization Sector of ITU, G.107, Jun. 2015, 30 pages, International Telecommunication Union.

* cited by examiner

QUANTIFYING APPLICATION QUALITY OF EXPERIENCE UNDER DIFFERENT PATH PERFORMANCE MOTIFS

TECHNICAL FIELD

The present disclosure relates generally to computer networks, and, more particularly, to quantifying application quality of experience (QoE) under different path performance motifs.

BACKGROUND

The user experience with online media applications, such as those used for video conferencing, streaming content, etc., is highly dependent on the performance of the network over which its traffic is conveyed. Today, the quality of experience (QoE) of media streams is often measured using static formulas and service level agreement (SLA) threshold definitions. The most prevalent method in use today relies on calculating the QoE as a mean opinion score (MOS) value. The formula for deriving the MOS value from network measurements (e.g., loss, latency, jitter) is also largely standardized, with the "E-Model" defined in the G.107 standard from the International Telecommunication Union (ITU) being the latest and mostly widely adopted methodology.

Testing has revealed that MOS values are not always a good proxy for the true QoE of media applications for multiple reasons. First, modern codecs used by many media applications are highly adaptive to the underlying network conditions and can even initiate corrective measures, such as by duplicating packets, using forward error correction (FEC), adapting the video frame rate or resolution, to name just a few. In addition, measuring network compliance with predefined SLA thresholds, which are often arbitrarily set, is commonly based on rolling averages over the course of minutes or hours. In other words, the results from multiple individual measurements are aggregated into a single average value. This has the unintended side effect of making different network degradation patterns result in very similar MOS values, even though some patterns can affect the true QoE of a media application more than others.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
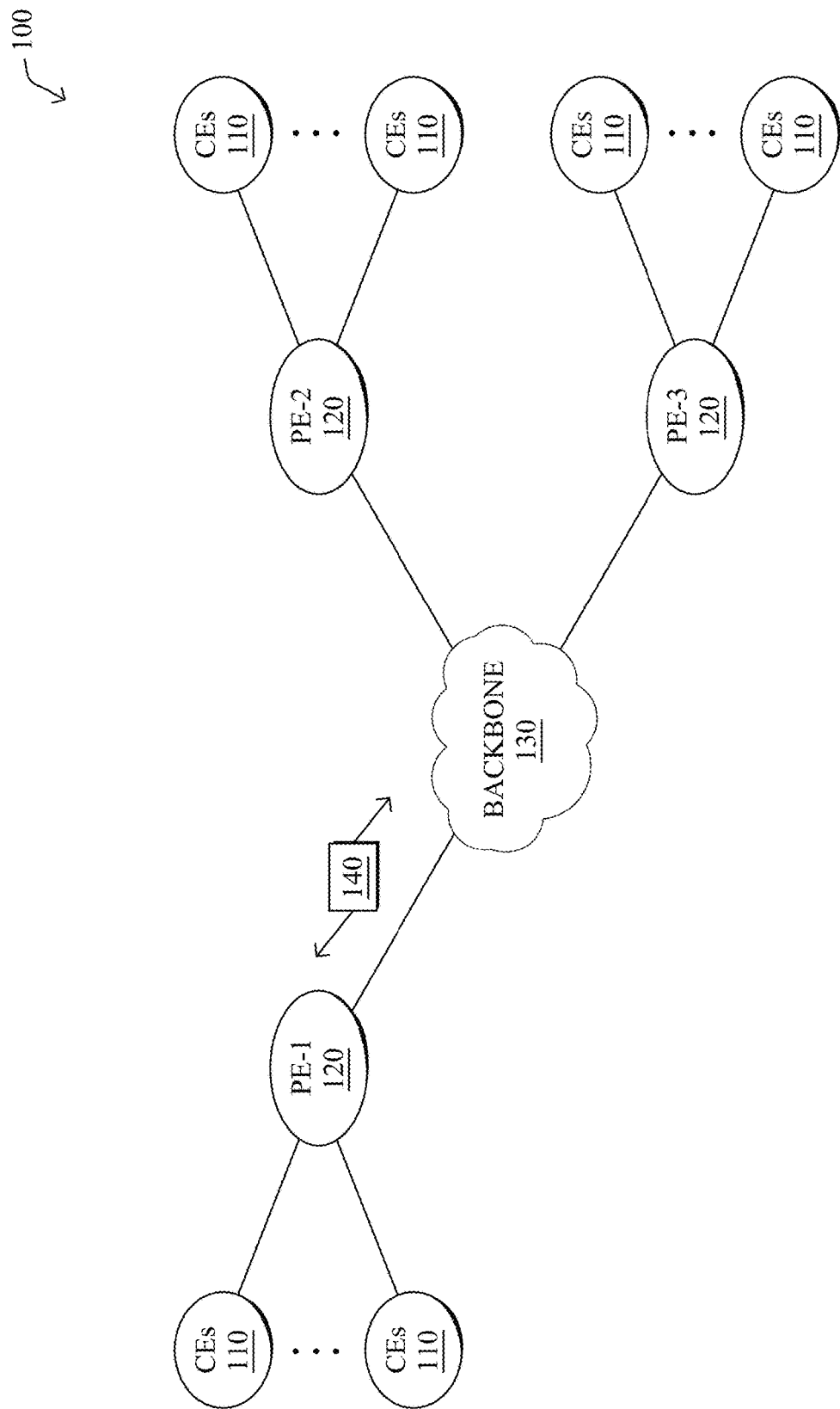
FIGS. 1A-1B illustrate an example communication network.

According to one or more embodiments of the disclosure, a device obtains media data captured by an endpoint of an online application that results from conducting a test in a network that subjects traffic of the online application to a particular network path degradation pattern. The device receives user feedback regarding the media data from one or more user interfaces. The device computes, based on the user feedback, a quality of experience metric for the online application associated with the particular network path degradation pattern. The device causes a configuration change to be made with respect to the online application, based on the quality of experience metric.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
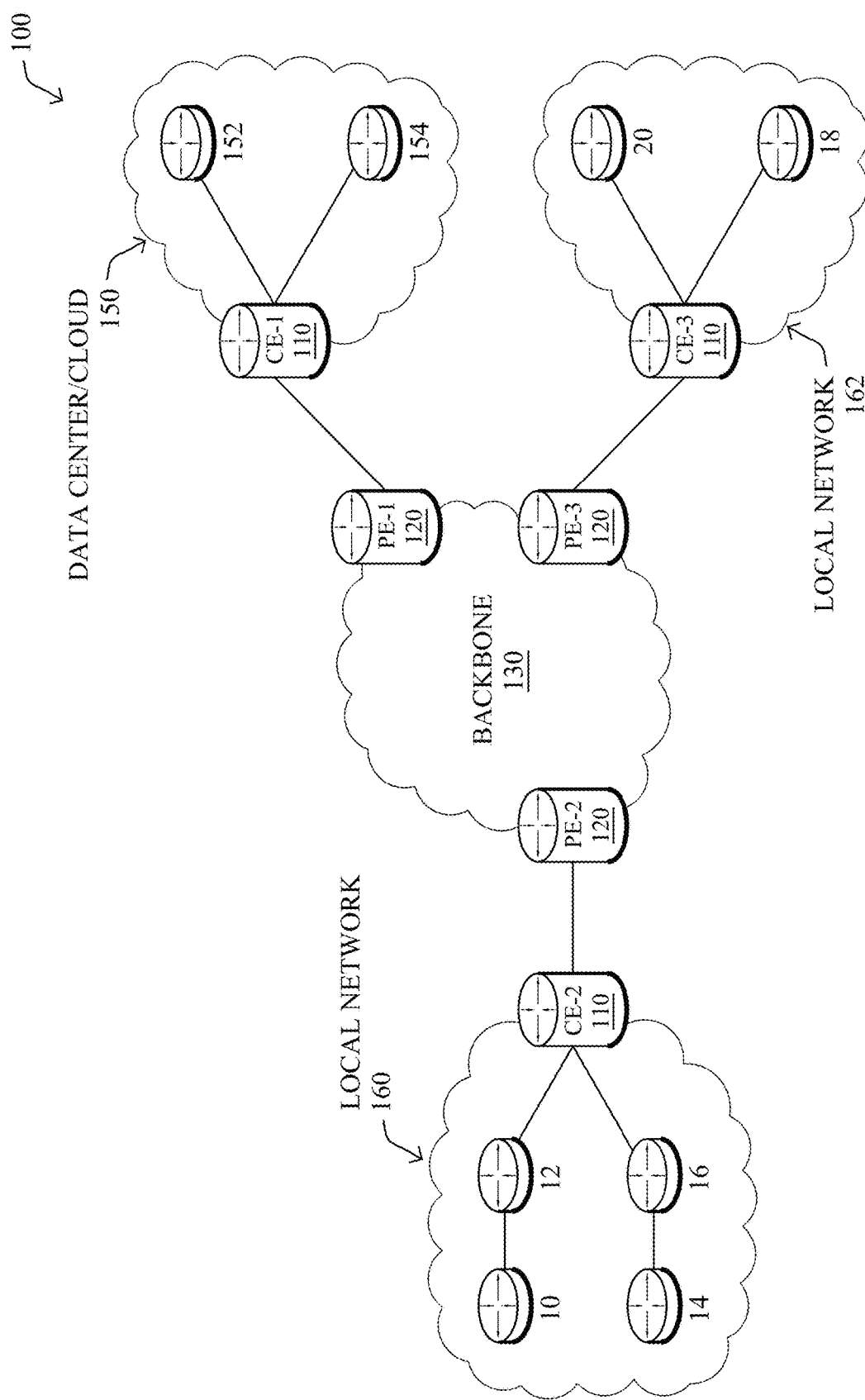

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
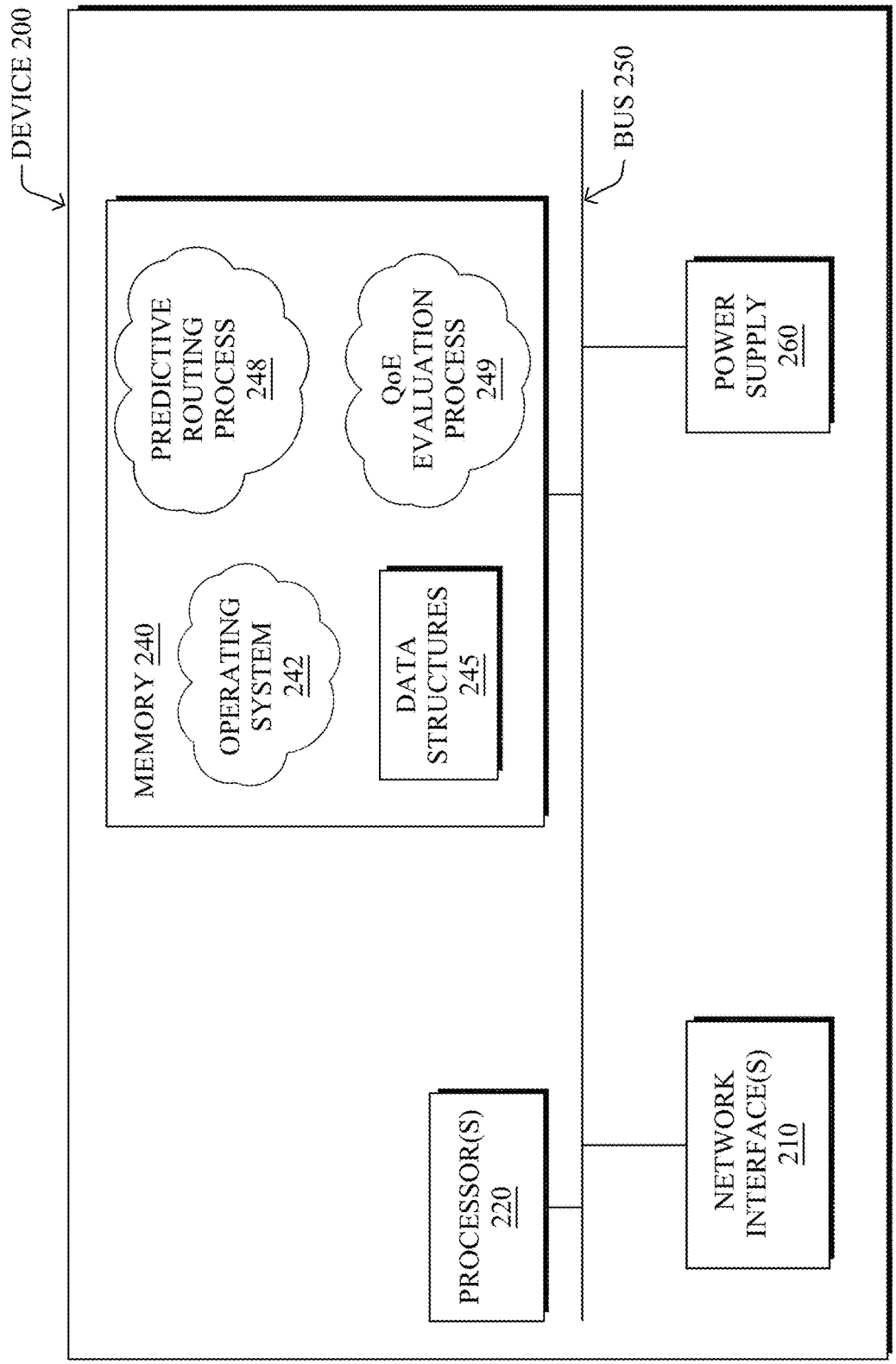
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a QoE evaluation process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or QoE evaluation process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or QoE evaluation process 249 may include computer executable instructions that, when executed by processor(s) 220, cause device 200 to perform the techniques described herein. To do so, in some embodiments, predictive routing process 248 and/or QoE evaluation process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or QoE evaluation process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or QoE evaluation process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
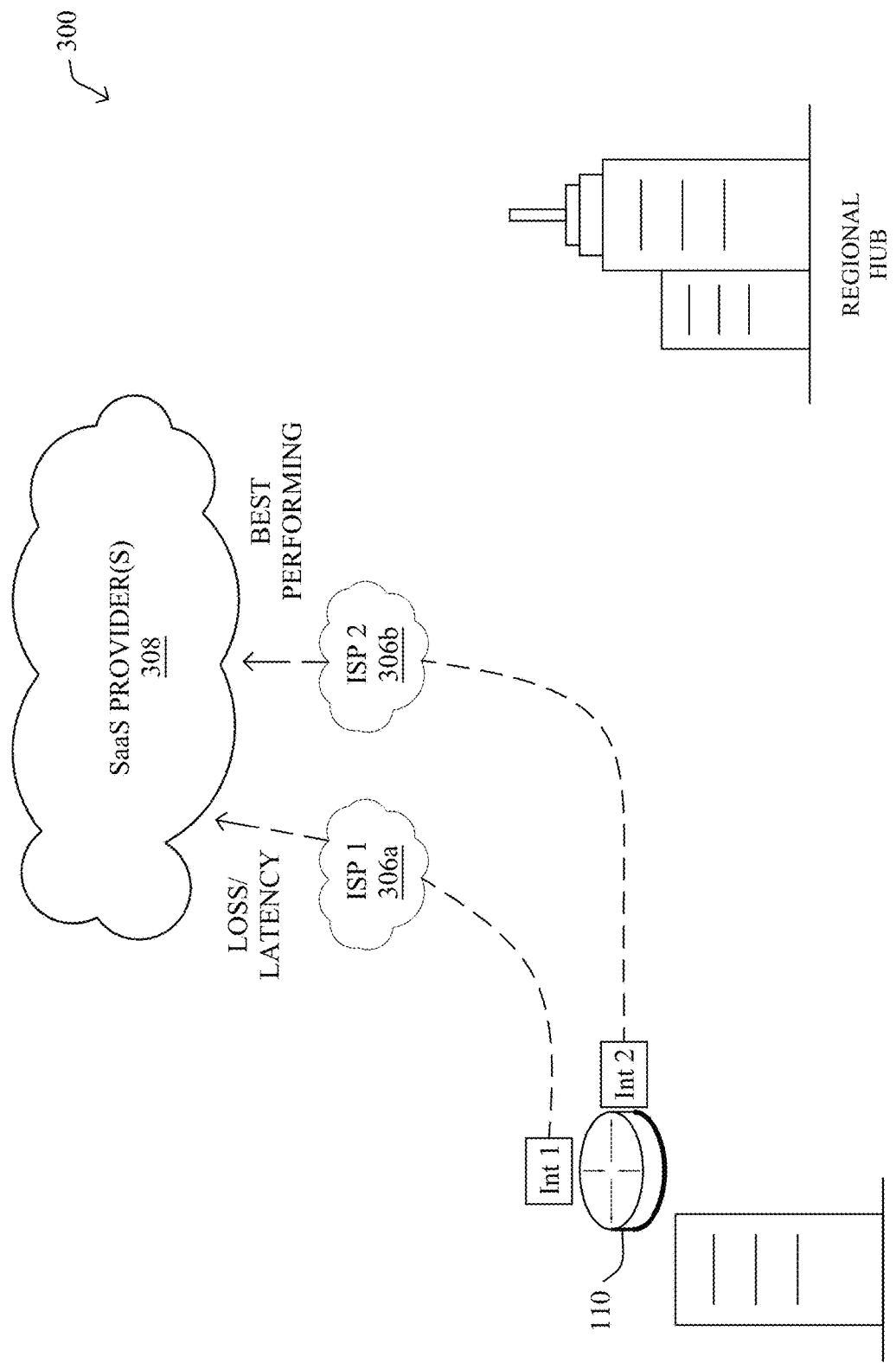
FIGS. 3A-3B illustrate example network deployments.
Figure 3B:
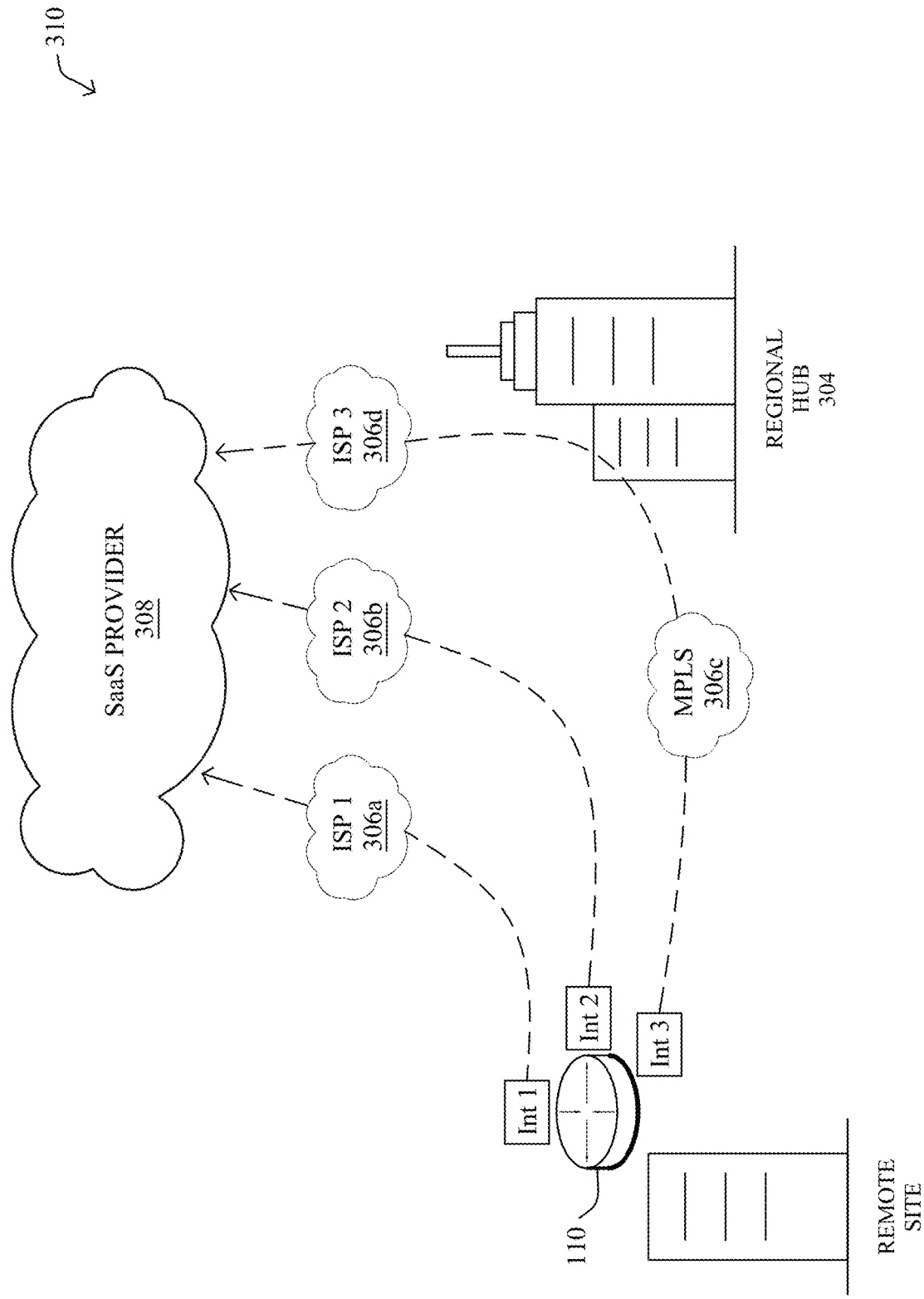

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
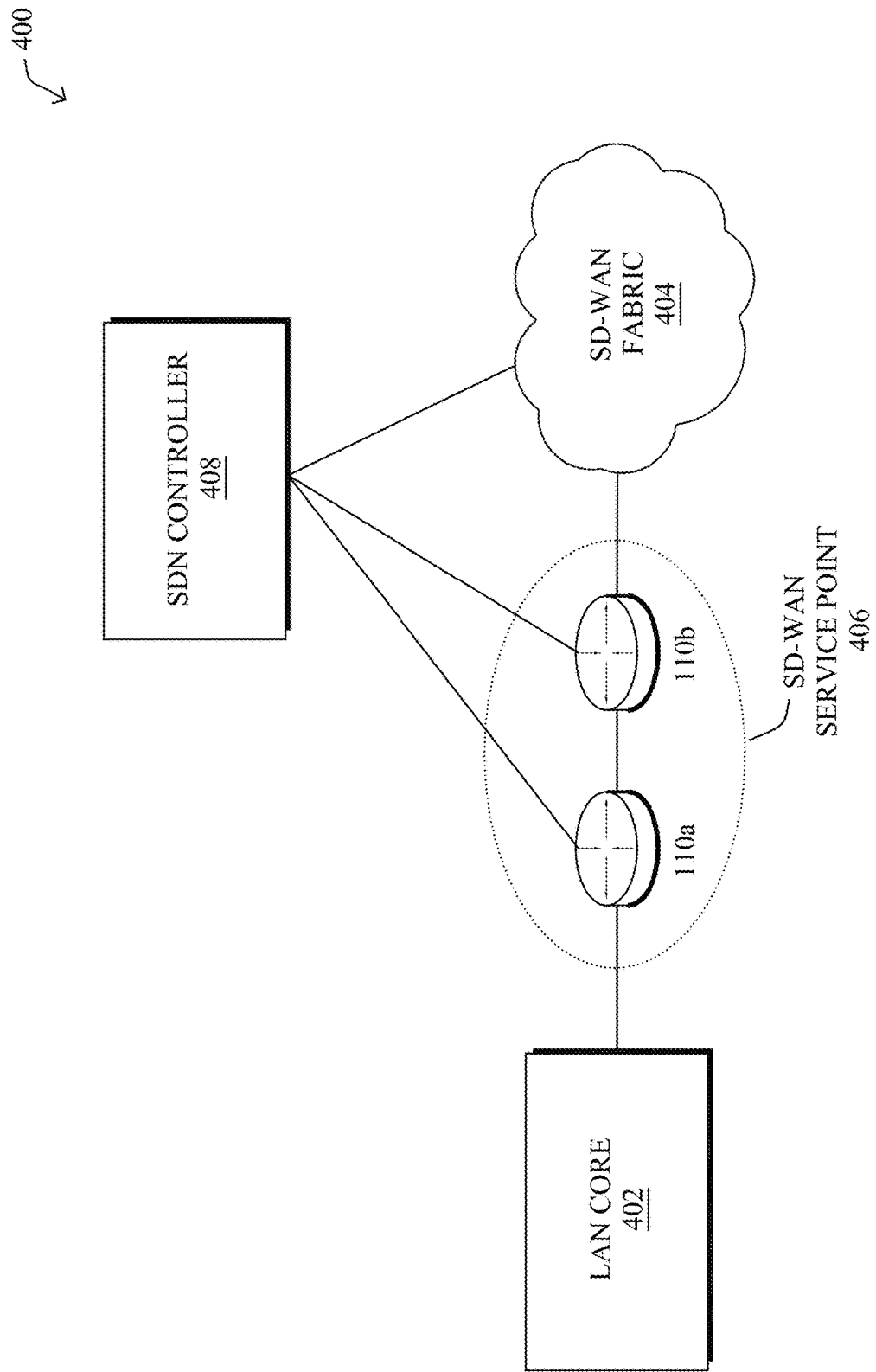
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in t e network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
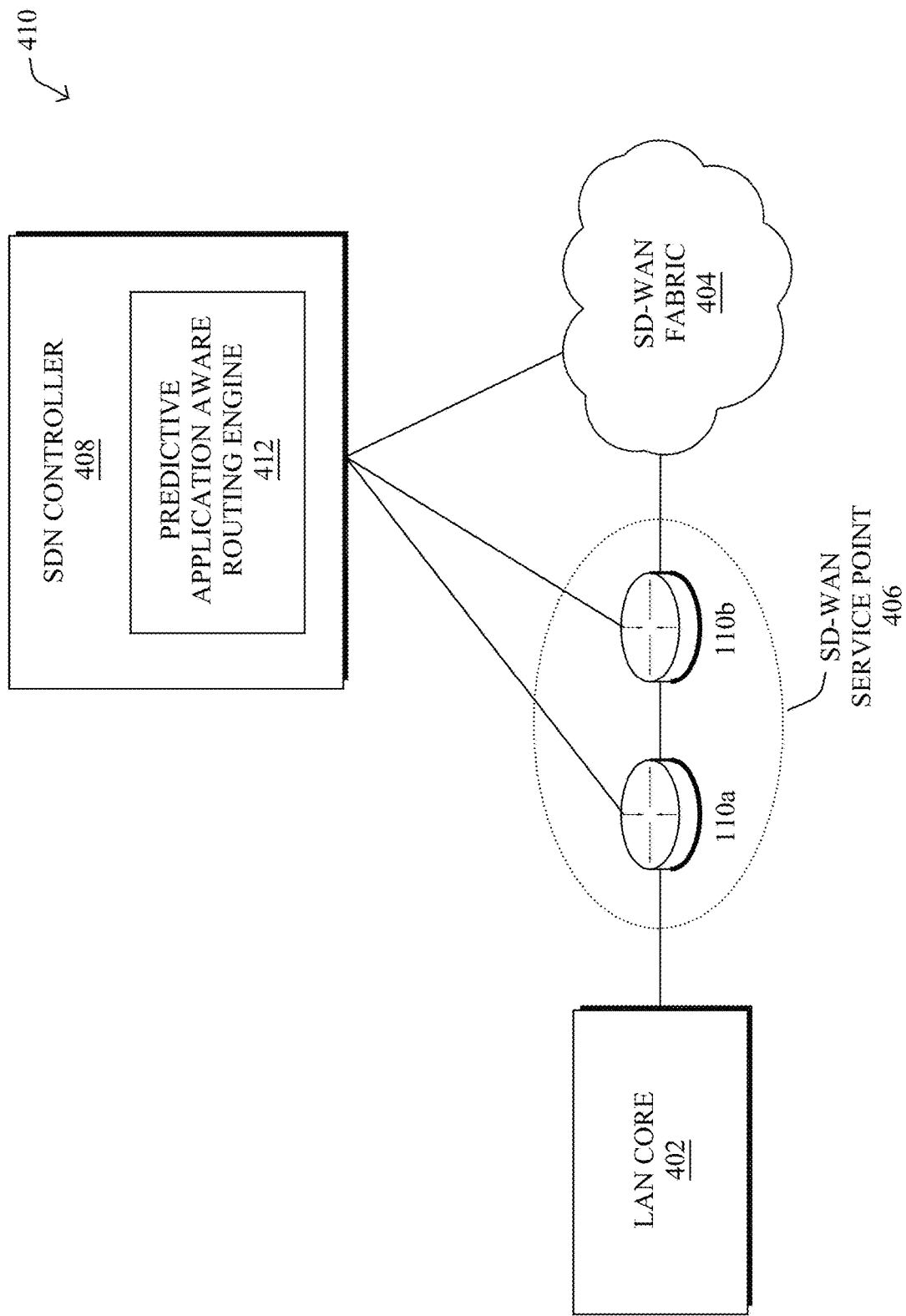

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, the user experience with online media applications, such as those used for video conferencing, streaming content, etc., is highly dependent on the performance of the network over which its traffic is conveyed. Today, the QoE of media streams is often measured using static formulas and SLA threshold definitions. The most prevalent method in use today relies on calculating the QoE as a mean opinion score (MOS) value. The formula for deriving the MOS value from network measurements (e.g., loss, latency, jitter) is also largely standardized, with the "E-Model" defined in the G.107 standard from the International Telecommunication Union (ITU) being the latest and mostly widely adopted methodology.

Testing has revealed that MOS values are not always a good proxy for the true QoE of media applications for multiple reasons. First, modern codecs used by many media applications are highly adaptive to the underlying network conditions and can even initiate corrective measures, such as by duplicating packets, using forward error correction (FEC), adapting the video frame rate or resolution, to name just a few. In addition, measuring network compliance with predefined SLA thresholds, which are often arbitrarily set, is commonly based on rolling averages over the course of minutes or hours. In other words, the results from multiple individual measurements are aggregated into a single average value. This has the unintended side effect of making different network degradation patterns result in very similar MOS values, even though some patterns can affect the true QoE of a media application more than others.

Figure 5A:
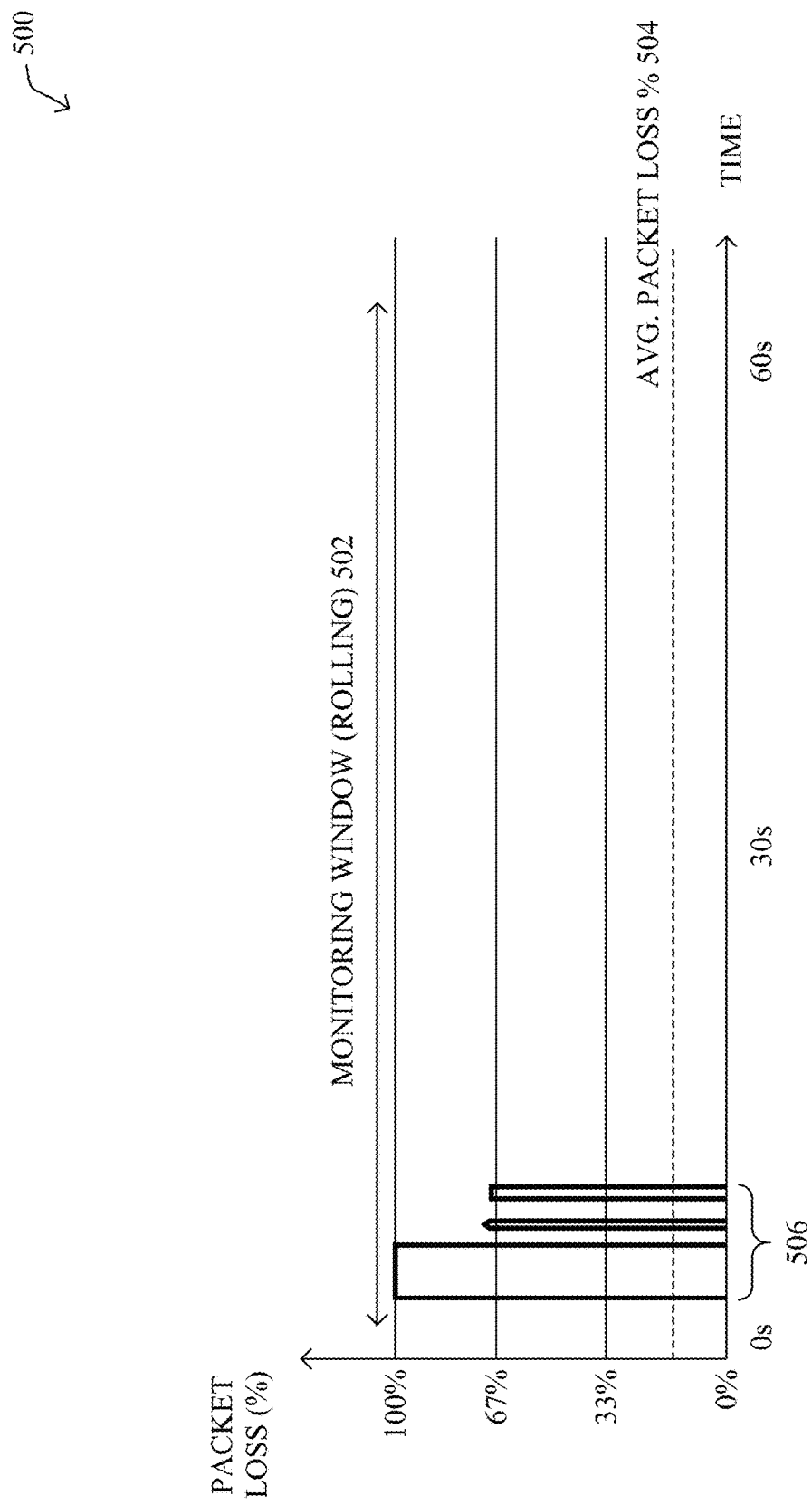
FIGS. 5A-5B illustrate example plots showing different degradation patterns for a path metric.
Figure 5B:
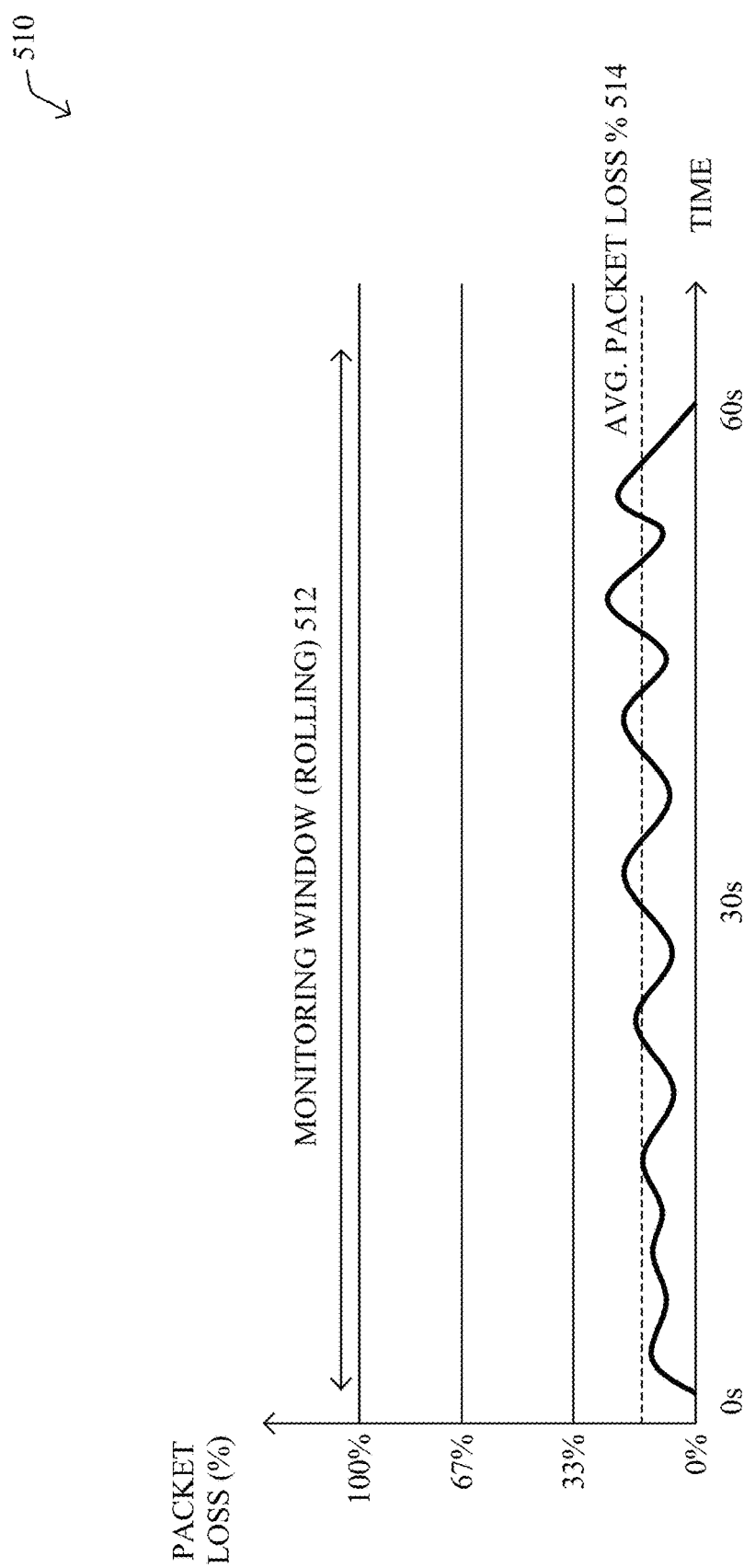

By way of example, FIGS. 5A-5B illustrate example plots showing different degradation patterns for a path metric. Plot 500 in FIG. 5A shows the packet loss percentage, measured along a network path over time during a (rolling) monitoring window 502. For instance, monitoring window 502 may be an interval of one minute, although longer or shorter monitoring windows may be used, as desired. Similarly, plot 510 in FIG. 5B shows the packet loss percentage measured along a network path over time during a monitoring window 512.

As shown, monitoring window 512 in plot 510 is of the same size as monitoring window 502 in FIG. 5A. However, both of plots 500, 510 represent different patterns/motifs for the packet loss in a given monitoring window. Indeed, plot 500 demonstrates a very high packet loss percentage localized at the beginning of the monitoring interval. However, plot 510 demonstrates only a relatively small packet loss percentage distributed over the entire monitoring window 512.

In both motifs shown in FIGS. 5A-5B, the average packet loss percentage ends up being the same. More specifically, even though the high packet loss percentage at the start of monitoring window 502 in plot 500 (i.e., in region 506) quickly resolves itself throughout the remainder of monitoring window 502, its average packet loss percentage 504 will still be equal to the average packet loss percentage 514 shown in plot 510.

Since MOS values are computed using average values over different time intervals, this means that both motifs in plots 500, 510 will result in the same MOS values. However, the true QoE from the standpoint of a user under both motifs may be vastly different. For instance, consider the case in which the online application uses a codec that is resilient to packet loss up to 30%. In such a case, this means that the user may not even perceive the path degradation in plot 510, as the codec is able to compensate for the elevated packet loss. Under the motif in plot 500, though, the large spikes in the packet loss percentage are well above what the codec can conceal, meaning that the user will perceive a notable drop in the QoE of the application.

Quantifying Application QoE Under Different Path Performance Motifs

The techniques introduced herein provide for the true application QoE to be quantified under different path performance motifs/patterns. In some aspects, repeatedly observed motifs may be captured across any number of links/paths in a network. For those deemed "of interest," these motifs may then be replayed as part of an emulation test, to capture their effects on the transmitted media data from the application. In turn, user feedback may be garnered for the captured media data and used to quantify the QoE of the application under the different motifs.

Illustratively, the techniques described herein may be performed by hardware, software, and/or firmware, such as in accordance with QoE evaluation process 249, which may include computer executable instructions executed by the processor 220 (or independent processor of interfaces 210) to perform functions relating to the techniques described herein, such as in conjunction with the operation of predictive routing process 248.

Specifically, according to various embodiments, a device obtains media data captured by an endpoint of an online application that results from conducting a test in a network that subjects traffic of the online application to a particular network path degradation pattern. The device receives user feedback regarding the media data from one or more user interfaces. The device computes, based on the user feedback, a quality of experience metric for the online application associated with the particular network path degradation pattern. The device causes a configuration change to be made with respect to the online application, based on the quality of experience metric.

Figure 6:
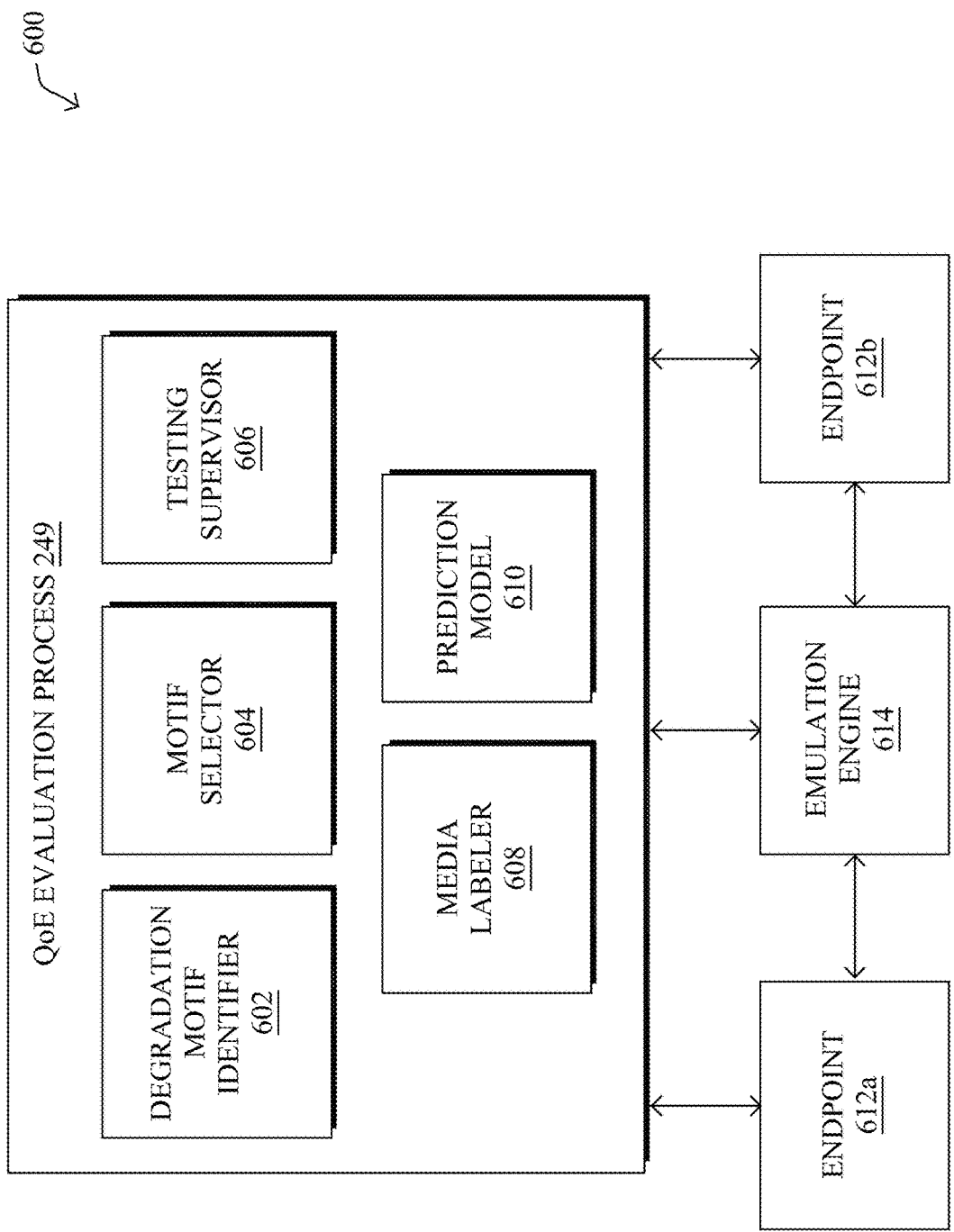
FIG. 6 illustrates an example architecture for quantifying the quality of experience (QoE) of an online application.

Operationally, FIG. 6 illustrates an example architecture 600 for quantifying the quality of experience (QoE) of an online application, according to various embodiments. At the core of architecture 600 is QoE evaluation process 249, which may be executed by a controller for a network, a server, a networking device, an endpoint, or another device in communication therewith. For instance, QoE evaluation process 249 may be executed by a controller for a network (e.g., SDN controller 408 in FIGS. 4A-4B), a particular networking device in the network (e.g., a router, etc.), or the like. In some embodiments, for instance, QoE evaluation process 249 may be used to implement a predictive application aware routing engine, such as predictive application aware routing engine 412, or another supervisory service for the network.

As shown, QoE evaluation process 249 may include any or all of the following components: a degradation motif identifier 602, a motif selector 604, a testing supervisor 606, a media labeler 608, and/or a prediction model 610. As would be appreciated, the functionalities of these components may be combined or omitted, as desired. In addition, these components may be implemented on a singular device or in a distributed manner, in which case the combination of executing devices can be viewed as their own singular device for purposes of executing QoE evaluation process 249.

In various embodiments, degradation motif identifier 602 may identify and capture the characteristics of recurring degradation motifs seen in the network. To this end, degradation motif identifier 602 may obtain and analyze network path telemetry from existing network devices, probing mechanisms, and/or other sources. The telemetry may be indicative of any number of path metrics such as, but not limited to, any or all of the following: jitter measurements, latency measurements, packet loss measurements, throughput measurements, or the like.

As would be appreciated, modern enterprise networks can already seamlessly combine multiple connectivity options such as MPLS L3/L2 VPNs, business Internet or retail broadband services delivered over diverse transport media like optical fiber, ADSL and cellular to connect users in the home, office, or campus to corporate and SaaS delivered applications, etc. There are also newer, public, or private 5G deployments as well as Low Earth Orbit (LEO) satellite networks from SpaceX, Amazon or Telesat, which are becoming increasingly popular and further extend the available underlay options.

Each of these connectivity options have different characteristics and behaviors that can usually result in completely different degradation motifs. For example, a site where WAN connectivity is provisioned over fiber might experience very low values of latency, jitter, and packet loss most of the times but may see short bursts of packet loss at random intervals caused by rerouting events in the provider network. Another site connected over a LEO satellite network might experience periods of a few seconds of connectivity loss when switching between satellites with high seasonality, or patterns of seasonal delay increases. A final example relates to sites connected over low bandwidth circuits where QoS is used to aggressively manage available resources. Different QoS strategies could introduce different motifs with QoS policies relying of RED/WRED resulting in random packet loss, traffic shaping leading to increased latency and jitter, while the absence of any QoS management altogether may result in traffic being dropped as the link approaches congestion.

To this end, degradation motif identifier 602 may employ any number of pattern recognition techniques, to identify the various motifs along the different network paths. For instance, degradation motif identifier 602 may use clustering techniques, timeseries analysis, or the like, to identify the various motifs. Note also that an identified motif may be for a single path metric or for a combination of different path metrics.

In various embodiments, motif selector 604 may be used to select which motifs identified by degradation motif identifier 602 are considered to be 'of interest' and require additional analysis by the other components of QoE evaluation process 249. In a simple embodiment, each motif identified by degradation motif identifier 602 may be flagged for additional analysis by motif selector 604. However, in further embodiments, motif selector 604 may do so based on a policy specified by a network administrator or other user, which may be specified via a user interface. For example, motif selector 604 may present information regarding the degradation motifs for review by a network administrator and the administrator may select which motifs are considered to be of interest. The presentation of the motifs to the administrator by motif selector 604 may also be performed in a selective or dynamic manner, such as by requesting review of a motif when it is first detect, it has been detected more than x number of times over y-number of hours (or other timespan), or the like.

In yet another embodiment, motif selector 604 may automatically flag degradation motifs of interest based on their similarities to previously evaluated motifs. Such similarities may be evaluated using a distance function (e.g., Euclidean, dynamic time wrapping, Kullback-Leibler divergence, etc.) between the candidate motif and its nearest neighbors in the set of motifs.

Testing supervisor 606 may be responsible for conducting testing in the network for any motifs flagged by motif selector 604 as of interest, in various embodiments. In general, such testing may entail replaying a degradation motif in the network and capturing the resulting media data (e.g., audio/voice files). To do so, testing supervisor 606 may provide supervisory control over an emulation engine 614 located along a path in the network and/or endpoints 612a-612b of that path. Thus, a conducted test may entail one client of the online application, endpoint 612a, sending traffic to another client, such as endpoint 612b, via the network path. For instance, in the case of a collaboration application, testing supervisor 606 may instruct endpoints 612a-612b to perform certain actions with respect to the application, such as joining a videoconferencing call, sending media data, leaving the call, etc. In the case of a collaboration application, for instance, a 'virtual' camera, microphone, etc. may be used by a given endpoint to send media data as part of the testing. Note that traffic may also be sent in the opposite direction during a test, to capture test results in that direction, as well.

During execution, emulation engine 614 may subject the application traffic sent between endpoints 612a-612b to a particular degradation motif specified by testing supervisor 606. To do so, emulation engine 614 may be executed either directly on a networking device along the path between endpoints 612a-612b or be in communication with one or more such networking devices. Thus, when endpoint 612a sends media traffic towards endpoint 612b via the application, emulation engine 614 will subject that traffic to the specified motif/pattern. For instance, emulation engine 614 may control the queues of the networking device, to inject latency, jitter, packet loss, or the like, into the traffic between endpoints 612a-612b. In turn, in various embodiments, the client/endpoint that receives the resulting traffic may capture the resulting media data that would be presented to its user and provide that media data back to testing supervisor 606 or another repository to which QoE evaluation process 249 has access.

Figure 7A:
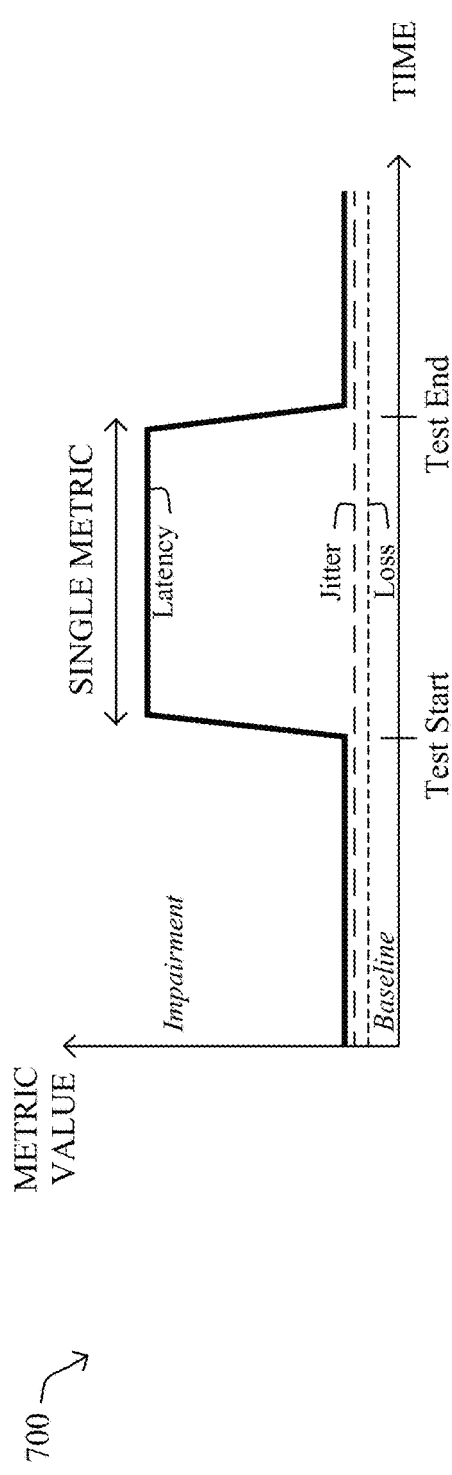
FIGS. 7A-7D illustrate example test patterns for testing the QoE of a media application.
Figure 7B:
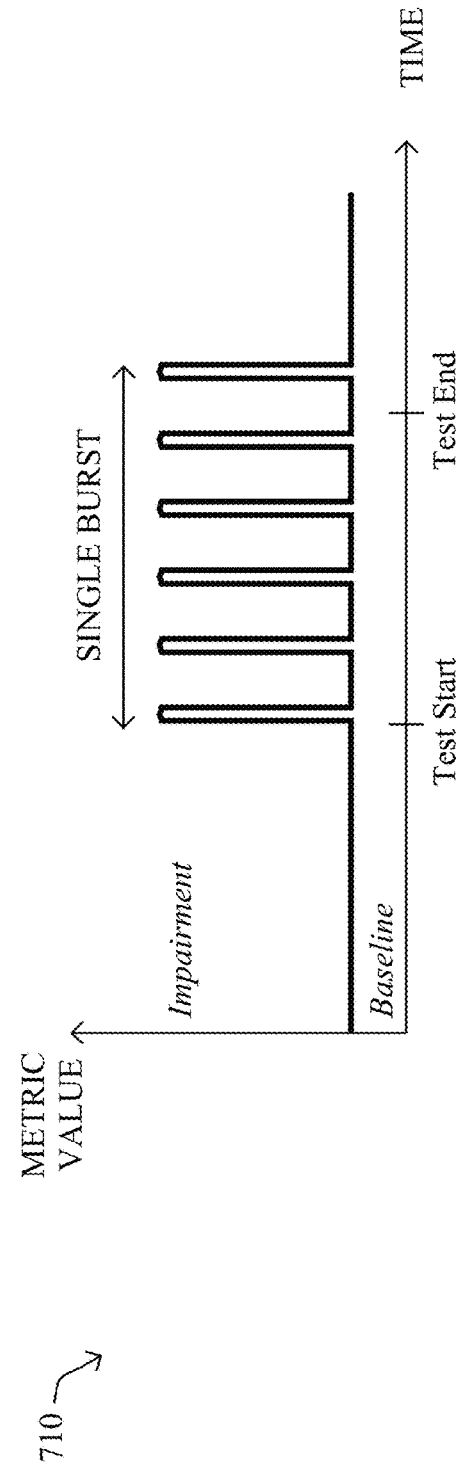
Figure 7C:
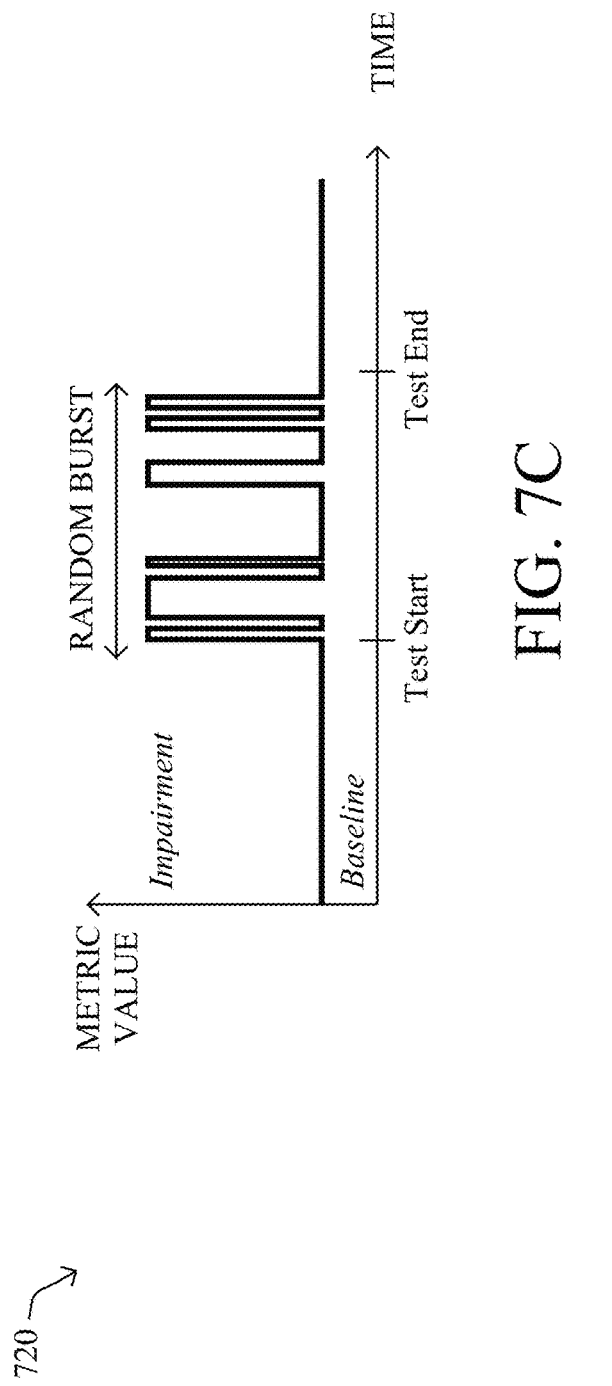

FIGS. 7A-7D illustrate example test patterns/motifs for testing the QoE of a media application, according to various embodiments. As shown in FIG. 7A, motif 700 illustrates the simple case of a single path metric, latency, being tested. Here, motif 700 may cause emulation engine 614 to increase the latency to a specified value for a continuous length of time during the test. Meanwhile, the other path metrics, such as jitter, and loss, may remain unaffected by the test. In further embodiments, though, a motif may adjust multiple path metrics, either together or separately, during a given test.

Figure 7D:
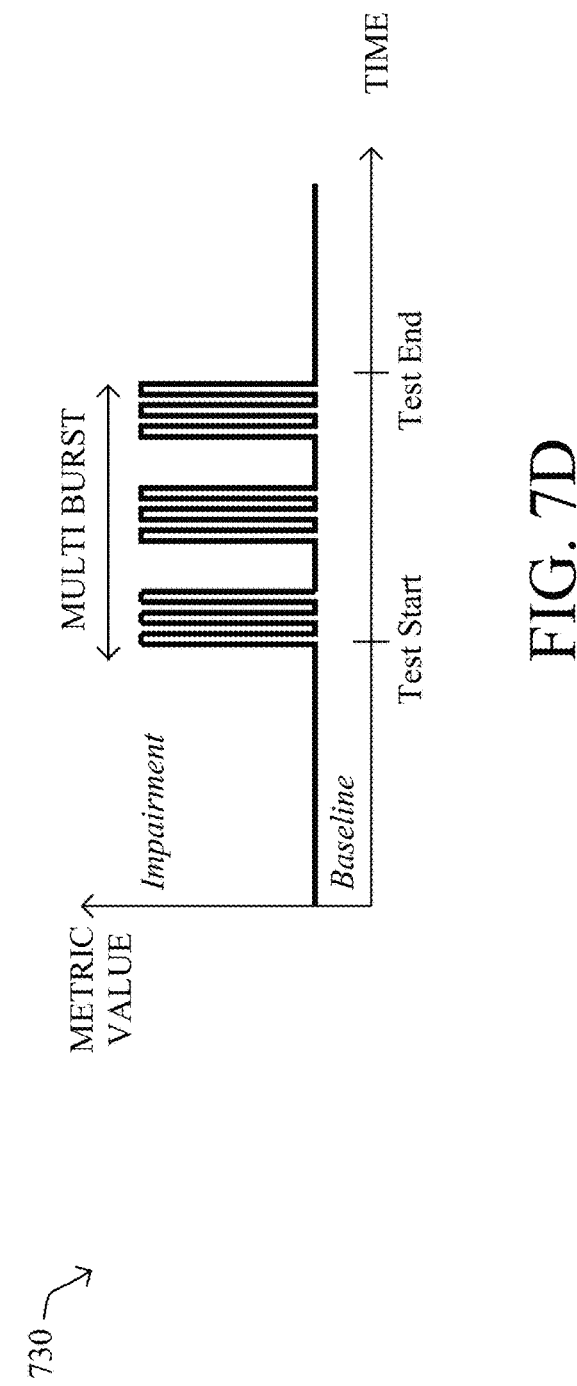

In some embodiments, a motif may also entail varying the tested metric(s) by value amount and/or by time. For instance, motif 710 in FIG. 7B may periodically increase the path metric to a specified amount and back down multiple times, as part of a single burst during the testing interval. However, in motif 720 in FIG. 7C, the timing of the increases/impairment may be random, as part of a random burst throughout the testing interval. In another instance, motif 730 in FIG. 7D shows a multi-burst pattern whereby the traffic is subjected to bursts of increases to the path metric.

Referring again to FIG. 6, testing supervisor 606 may also control one or more parameters of the online application, in addition to controlling which motif/patter is used for the test. Indeed, different applications may have built-in mechanisms to help compensate for network issues, such as selecting a particular codec, controlling codec behavior, employing FEC, duplicating packets, or the like. Accordingly, testing supervisor 606 may also specify to the clients/endpoints 612a-612b how the application should send its media traffic during the test.

According to various embodiments, media labeler 608 may be configured to obtain user feedback regarding the media data captured from the testing conducted by testing supervisor 606. To do so, for instance, media labeler 608 may provide the media data to one or more user interfaces, requesting that the users provide their thoughts as to the quality of the media. A reward program can be implemented to incentivize users to provide feedback on a regular basis.

Figure 8:
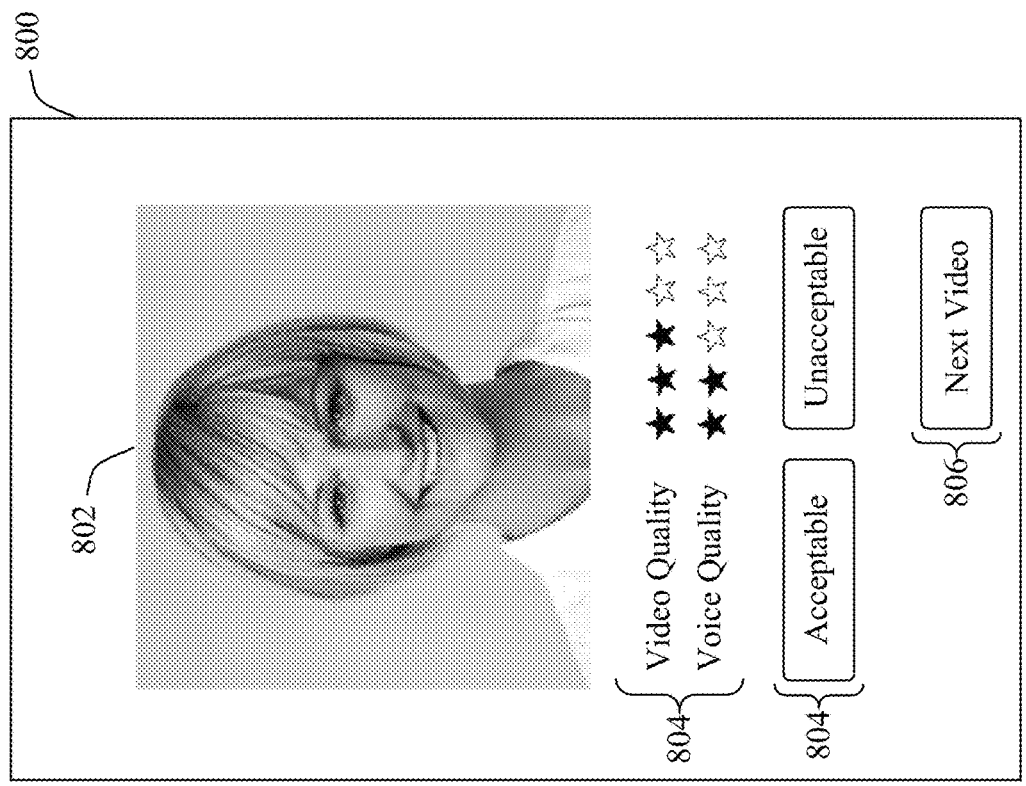
FIG. 8 illustrates an example user interface for garnering user feedback regarding test results.

FIG. 8 illustrates an example user interface 800 for garnering user feedback regarding test results, according to various embodiments. As shown, assume that media data 802 was captured during a test of a videoconferencing application that subjected the application traffic to a particular degradation motif/pattern. To garner user feedback regarding media data 802, user interface 800 may ask the user to provide ratings 804 (e.g., on a scale of 1-5) independently for the voice and video quality of media data 802. Table 1 below provides an example of what these scores may mean:

TABLE 1

| Score | Quality/Satisfaction | Degradation |
| --- | --- | --- |
| 5 | Excellent | Imperceptible |
| 4 | Good | Perceptible, but not annoying |
| 3 | Fair | Slightly annoying |
| 2 | Poor | Annoying |
| 1 | Bad | Very Annoying |

In addition, user interface 800 may also request that the user provide an overall rating 804 such as the following:

TABLE 2

| Overall Score | Meaning |
|---|---|
| Acceptable | The user would continue the meeting, without mentioning the degradation. |
| Unacceptable | The user would interrupt the meeting and ask for a change (speaker rejoins, reconnect, reschedule) |

Of course, other labels/rating scales could be used, in other embodiments, as desired. In addition, in some cases, user interface 800 may also include an option 806, to review multiple sets of test results/media files. Typically, user interface 800 may be provided to a potentially large audience (e.g., through the use of crowdsourcing mechanisms, such as Mechanical Turk).

Referring yet again to FIG. 6, the results of media labeler 608 is a pool of ratings/labels that can then be used as training data to train prediction model 610, in various embodiments. Indeed, by obtaining the user feedback regarding the media data that resulted from emulating the different motifs/degradation patterns, prediction model 610 can then be trained to predict the resulting application QoE that will result from a given path metric pattern/motif. For example, a supervised learning algorithm (e.g., SVM, tree-based methods, neural networks) may be trained to perform a regression of the QoE input a set of motif features. Note that the input features may also be engineered by hand in order to represent the motif of interest. In other instances, pre-training using self-supervised learning (SSL) could also be used, to obtain a meaningful representation. Transformations could also be performed, such as when the motifs take the form of multi-dimensional time series.

In some embodiments, prediction model 610 may also be constantly reevaluated based on user feedback, newly-discovered applications, new motifs, or the like, to correlate user feedback with motif per application. The ultimate outcome is a good understanding of each motif and the impact that it has on the QoE of the application.

According to various embodiments, the QoE metric determined by QoE evaluation process 249 for a given degradation motif/pattern may be used to initiate one or more configuration changes with respect to the online application. For instance, in the case of a predictive routing engine being used in the network, assume that a given network path is exhibiting a particular motif or is predicted to do so. In such a case, prediction model 610 may predict the QoE for the application under such a motif. If the QoE is considered unacceptable, the traffic of the application may be rerouted onto a different network path. In another instance, the configuration change may be to a parameter of the application itself, such as by adjusting the operation of the codec of the application, causing the application to utilize FEC or packet duplication, or the like.

In other cases, the configuration change may be made indirectly, such as by providing data indicative of a specific motif and its predicted QoE to a user interface. In turn, an administrator may use the presented information to make the configuration change to the network and/or application.

Figure 9:
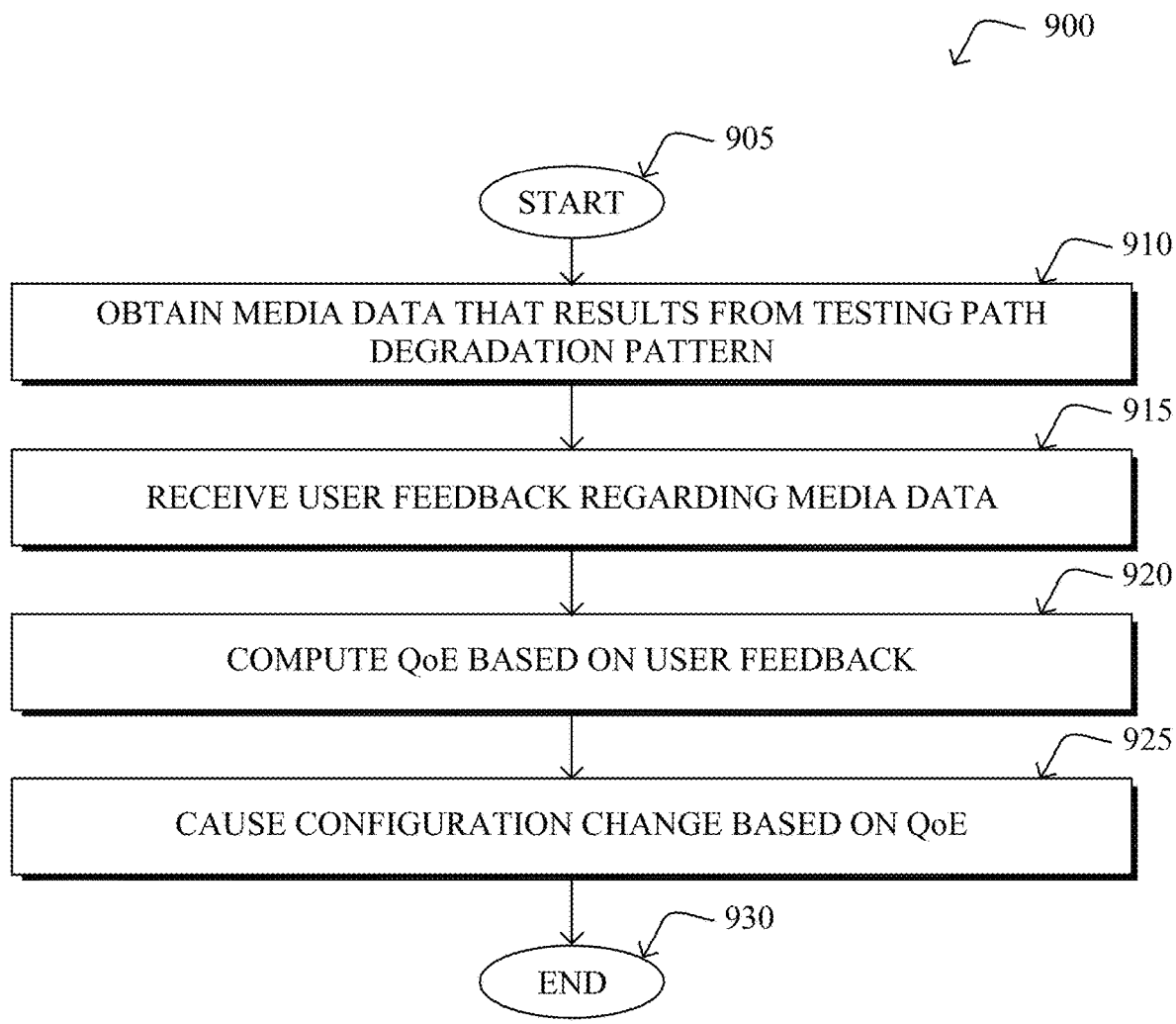
FIG. 9 illustrates an example simplified procedure for quantifying the QoE of an online application.

FIG. 9 illustrates an example simplified procedure for quantifying the QoE of an online application, in accordance with one or more embodiments described herein. For example, a non-generic, specifically configured device (e.g., device 200), such as controller for a network (e.g., an SDN controller), a server, a networking device, or any other device in communication therewith, may perform procedure 900 by executing stored instructions (e.g., process 249), to provide a supervisory service to a network. The procedure 900 may start at step 905, and continues to step 910, where, as described in greater detail above, the device may obtain media data captured by an endpoint of an online application that results from conducting a test in a network that subjects traffic of the online application to a particular network path degradation pattern. In some embodiments, the device may also instruct a networking device to conduct the test in the network by subjecting traffic of the online application to the particular network path degradation pattern. In various embodiments, the online application is a collaboration application via which users may send audio and/or video to one or more other users (e.g., a videoconferencing application, etc.).

In some embodiments, the particular network path degradation pattern causes a network path via which the traffic of the online application to exhibit at least one of: increased loss, increased latency, or increased jitter. In a further embodiment, the device may also identify the particular network path degradation pattern from network path telemetry data (e.g., as a repeatedly seen pattern). In yet another embodiment, the device may also receive an indication from a user interface that the particular network path degradation pattern is of interest, prior to the test being conducted.

At step 915, as detailed above, the device may receive user feedback regarding the media data from one or more user interfaces. In various embodiments, the device may do so by sending the media data to the one or more user interfaces, requesting one or more users to provide satisfaction rations for the media data. For instance, a given user may be asked to rate the video quality of the media data, the voice/audio quality of the media data, an overall rating of the media data, or the like.

At step 920, the device may compute, based on the user feedback, a quality of experience metric for the online application associated with the particular network path degradation pattern, as described in greater detail above. In some embodiments, the device may do so by using the user feedback as training data to train a machine learning model to predict quality of experience metrics for different network path degradation patterns.

At step 925, as detailed above, the device may cause a configuration change to be made with respect to the online application, based on the quality of experience metric. In some embodiments, the device may do so by providing, by the device, data indicative of the quality of experience metric and the particular network path degradation pattern for display. In some embodiments, the configuration change comprises making an adjustment to how the traffic of the online application is routed. Other examples of configuration changes may include, but are not limited to, configuring a codec of the online application, causing the application to duplicate packets, causing the application to use Forward Error Correction (FEC), combinations thereof, or the like. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for quantifying the QoE of an online application under different path performance motifs (i.e., patterns), it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
receiving, by a device, a selection of a particular network path degradation pattern from a user interface, wherein the particular network path degradation pattern is from network path telemetry data of a network, further wherein the selection indicates that the particular network path degradation pattern is of interest;
obtaining, by the device and after receiving the selection of particular network path degradation pattern from the user interface, media data captured by an endpoint of an online application that results from conducting a test in the network that subjects traffic of the online application to the particular network path degradation pattern;
receiving, at the device, user feedback regarding the media data from one or more user interfaces;
computing, by the device and based on the user feedback, a quality of experience metric for the online application associated with the particular network path degradation pattern; and
causing, by the device, a configuration change to be made with respect to the online application, based on the quality of experience metric and the particular network path degradation pattern.

2. The method as in claim 1, wherein the device causes the configuration change to be made with respect to the online application comprises:
providing, by the device, data indicative of the quality of experience metric and the particular network path degradation pattern for display.

3. The method as in claim 1, further comprising:
instructing a networking device to conduct the test in the network by subjecting traffic of the online application to the particular network path degradation pattern.

4. The method as in claim 1, wherein the particular network path degradation pattern causes a network path via which the traffic of the online application to exhibit at least one of: increased loss, increased latency, or increased jitter.

5. The method as in claim 1, wherein computing the quality of experience metric for the online application associated with the particular network path degradation pattern comprises:

using the user feedback as training data to train a machine learning model to predict quality of experience metrics for different network path degradation patterns.

6. The method as in claim 1, wherein the configuration change comprises making an adjustment to how the traffic of the online application is routed.

7. The method as in claim 1, wherein the user feedback comprises a satisfaction rating for the media data.

8. The method as in claim 1, wherein the online application is a collaboration application.

9. An apparatus, comprising:
one or more network interfaces;
a processor coupled to the one or more network interfaces and configured to execute one or more processes; and
a memory configured to store a process that is executable by the processor, the process when executed configured to:
receive a selection of a particular network path degradation pattern from a user interface, wherein the particular network path degradation pattern is from network path telemetry data of a network, further wherein the selection indicates that the particular network path degradation pattern is of interest;
obtain, after receiving the selection of particular network path degradation pattern from the user interface, media data captured by an endpoint of an online application that results from conducting a test in the network that subjects traffic of the online application to the particular network path degradation pattern;
receive user feedback regarding the media data from one or more user interfaces;
compute, based on the user feedback, a quality of experience metric for the online application associated with the particular network path degradation pattern; and
cause a configuration change to be made with respect to the online application, based on the quality of experience metric and the particular network path degradation pattern.

10. The apparatus as in claim 9, wherein the apparatus causes the configuration change to be made with respect to the online application comprises:
providing data indicative of the quality of experience metric and the particular network path degradation pattern for display.

11. The apparatus as in claim 9, wherein the process when executed is further configured to:
instruct a networking device to conduct the test in the network by subjecting traffic of the online application to the particular network path degradation pattern.

12. The apparatus as in claim 9, wherein the particular network path degradation pattern causes a network path via which the traffic of the online application to exhibit at least one of: increased loss, increased latency, or increased jitter.

13. The apparatus as in claim 9, wherein the apparatus computes the quality of experience metric for the online application associated with the particular network path degradation pattern by:
using the user feedback as training data to train a machine learning model to predict quality of experience metrics for different network path degradation patterns.

14. The apparatus as in claim 9, wherein the configuration change comprises making an adjustment to how the traffic of the online application is routed.

15. The apparatus as in claim 9, wherein the user feedback comprises a satisfaction rating for the media data.

16. A tangible, non-transitory, computer-readable medium storing program instructions that cause a device to execute a process comprising:
- receiving, by a device, a selection of a particular network path degradation pattern from a user interface, wherein the particular network path degradation pattern is from network path telemetry data of a network, further wherein the selection indicates that the particular network path degradation pattern is of interest;
- obtaining, by the device and after receiving the selection of particular network path degradation pattern from the user interface, media data captured by an endpoint of an online application that results from conducting a test in the network that subjects traffic of the online application to the particular network path degradation pattern;
- receiving, at the device, user feedback regarding the media data from one or more user interfaces;
- computing, by the device and based on the user feedback, a quality of experience metric for the online application associated with the particular network path degradation pattern; and
- causing, by the device a configuration change to be made with respect to the online application, based on the quality of experience metric and the particular network path degradation pattern.

* * * * *